(12) United States Patent
Hirotani et al.

(10) Patent No.: US 10,199,895 B2
(45) Date of Patent: Feb. 5, 2019

(54) PERMANENT MAGNET TYPE MOTOR AND ELECTRIC POWER STEERING APPARATUS

(71) Applicant: Mitsubishi Electric Corporation, Tokyo (JP)

(72) Inventors: Yu Hirotani, Tokyo (JP); Minako Iefuji, Tokyo (JP); Yuji Takizawa, Tokyo (JP); Sachiko Kawasaki, Tokyo (JP); Masatsugu Nakano, Tokyo (JP); Toyoaki Udo, Tokyo (JP); Satoru Akutsu, Tokyo (JP)

(73) Assignee: Mistubishi Electric Corporation, Tokyo (JP)

( * ) Notice: Subject to any disclaimer, the term of this patent is extended or adjusted under 35 U.S.C. 154(b) by 569 days.

(21) Appl. No.: 14/652,865

(22) PCT Filed: Apr. 9, 2013

(86) PCT No.: PCT/JP2013/060679
§ 371 (c)(1),
(2) Date: Jun. 17, 2015

(87) PCT Pub. No.: WO2014/167645
PCT Pub. Date: Oct. 16, 2014

(65) Prior Publication Data
US 2015/0333586 A1 Nov. 19, 2015

(51) Int. Cl.
*H02K 3/28* (2006.01)
*H02K 1/27* (2006.01)
(Continued)

(52) U.S. Cl.
CPC ............ *H02K 3/28* (2013.01); *H02K 1/16* (2013.01); *H02K 1/2706* (2013.01); *H02K 1/278* (2013.01);
(Continued)

(58) Field of Classification Search
CPC .......... H02K 29/03; H02K 1/278; H02K 3/28; H02K 1/2706; H02K 1/16; H02K 7/14;
(Continued)

(56) References Cited

U.S. PATENT DOCUMENTS

| | | | | |
|---|---|---|---|---|
| 4,550,267 A | * | 10/1985 | Vaidya | H02K 3/28 310/112 |
| 4,782,272 A | * | 11/1988 | Buckley | H02K 29/08 318/400.01 |

(Continued)

FOREIGN PATENT DOCUMENTS

| | | | |
|---|---|---|---|
| CN | 102545429 A | 7/2012 | |
| EP | 2107666 A2 * | 10/2009 | ............ H02K 1/278 |

(Continued)

OTHER PUBLICATIONS

Communication dated Apr. 11, 2017, from the Japanese Patent Office in counterpart Japanese application No. 2016-181364.

(Continued)

*Primary Examiner* — Mohamad Musleh
(74) *Attorney, Agent, or Firm* — Sughrue Mion, PLLC; Richard C. Turner

(57) ABSTRACT

To obtain a permanent magnet type motor capable of securing controllability of a motor and utilizing reluctance torque. An armature winding is a plurality of sets of polyphase windings; the plurality of sets of the armature winding is supplied with current from each individual inverter; the rotor core is provided with permanent magnets on a surface portion thereof, the permanent magnets being circumferentially arranged and the adjacent permanent magnets having polarities opposite to each other; a protrusion portion is provided between the adjacent permanent magnets, the protrusion portion being provided in a protruding condition from the rotor core and being made of a magnetic substance; and a non-magnetic gap portion is interposed between the (Continued)

protrusion portion and the permanent magnet in a rotating shaft direction.

12 Claims, 16 Drawing Sheets

(51) Int. Cl.
    *H02K 1/16* (2006.01)
    *H02K 7/14* (2006.01)
    *H02K 11/00* (2016.01)
    *H02K 29/03* (2006.01)
    *H02K 29/08* (2006.01)
    *H02K 11/215* (2016.01)
    *H02K 11/33* (2016.01)

(52) U.S. Cl.
    CPC .......... *H02K 7/14* (2013.01); *H02K 11/0094* (2013.01); *H02K 11/215* (2016.01); *H02K 11/33* (2016.01); *H02K 29/03* (2013.01); *H02K 29/08* (2013.01); *H02K 2201/03* (2013.01); *H02K 2213/03* (2013.01); *H02K 2213/12* (2013.01)

(58) Field of Classification Search
    CPC ...... H02K 29/08; H02K 11/215; H02K 11/33; H02K 11/0094; H02K 2213/12; H02K 2201/03; H02K 2213/03
    See application file for complete search history.

(56) References Cited

U.S. PATENT DOCUMENTS

| | | | |
|---|---|---|---|
| 5,397,951 A | | 3/1995 | Uchida et al. |
| 5,625,276 A | * | 4/1997 | Scott ................. B23K 9/1062 310/114 |
| 5,886,504 A | * | 3/1999 | Scott ................. B23K 9/1062 322/15 |
| 9,627,936 B2 | * | 4/2017 | Nakano ................. H02K 1/2746 |
| 2002/0101126 A1 | | 8/2002 | Crapo et al. |
| 2004/0155537 A1 | * | 8/2004 | Nakano ..................... F03D 9/25 310/51 |
| 2006/0049713 A1 | * | 3/2006 | Toide ..................... H02K 1/187 310/216.057 |
| 2006/0220486 A1 | | 10/2006 | Miyashita et al. |
| 2007/0194650 A1 | * | 8/2007 | Ito ........................... H02K 3/28 310/179 |
| 2009/0224627 A1 | | 9/2009 | Hino et al. |
| 2009/0251023 A1 | | 10/2009 | Nakano et al. |
| 2010/0207475 A1 | * | 8/2010 | Kawasaki ............ G01D 5/2046 310/156.08 |
| 2012/0019083 A1 | * | 1/2012 | Elantably ............. H02K 19/103 310/49.44 |
| 2012/0098379 A1 | * | 4/2012 | Yamaguchi ............ H02K 3/522 310/198 |
| 2012/0139380 A1 | | 6/2012 | Taniguchi |
| 2012/0274160 A1 | | 11/2012 | Hino et al. |
| 2015/0280502 A1 | * | 10/2015 | Hirotani ................. H02K 29/03 310/68 R |

FOREIGN PATENT DOCUMENTS

| | | |
|---|---|---|
| JP | 5161287 A | 6/1993 |
| JP | 5-199684 A | 8/1993 |
| JP | 07-264822 A | 10/1995 |
| JP | 07-298685 A | 11/1995 |
| JP | 09-298864 A | 11/1997 |
| JP | 11-266573 A | 9/1999 |
| JP | 2005237161 A | 9/2005 |
| JP | 2006-288028 A | 10/2006 |
| JP | 2009-213256 A | 9/2009 |
| JP | 2009-254103 A | 10/2009 |
| JP | 2010-063255 A | 3/2010 |
| JP | 2012-125006 A | 6/2012 |
| JP | 2013038950 A | 2/2013 |

OTHER PUBLICATIONS

Communication dated Aug. 30, 2016 from the Japanese Patent Office in counterpart application No. 2015-510991.
Communication dated Aug. 25, 2015 from the Japanese Patent Office in counterpart application No. 2015-510991.
Communication dated Mar. 15, 2016, from the Japanese Patent Office in counterpart application No. 2015-510991.
Communication dated Nov. 24, 2016 from the European Patent Office in counterpart application No. 13881895.0.
Communication dated Jan. 13, 2017 from the State Intellectual Property Office of the P.R.C., in counterpart Chinese application No. 201380075407.4.
International Search Report for PCT/JP2013/060679 dated Jul. 9, 2013.
Communication dated Feb. 2, 2018 from the State Intellectual Property Office of the P.R.C. in counterpart Chinese application No. 201380075407.4
Communication dated Feb. 8, 2018 from the European Patent Office in counterpart European application No. 13881895.0.
Communication dated Nov. 14, 2017, from the Japanese Patent Office in counterpart Japanese application No. 2015-510991.
Communication dated Nov. 3, 2017 from the State Intellectual Property Office of the People's Republic of China in counterpart Chinese application No. 201380075407.4.
Communication dated Sep. 26, 2017 from the Japanese Patent Office in counterpart Application No. 2016-181364.
Communication dated May 19, 2017 from the State Intellectual Property Office of the P.R.C. in counterpart Application No. 201380075407.4.
Communication dated Jul. 18, 2017, from the Japanese Patent Office in counterpart application No. 2015-510991.

* cited by examiner

PERMANENT MAGNET TYPE MOTOR AND ELECTRIC POWER STEERING APPARATUS

CROSS REFERENCE TO RELATED APPLICATIONS

This application is a National Stage of International Application No. PCT/JP2013/060679 filed Apr. 9, 2013, the contents of all of which are incorporated herein by reference in their entirety.

TECHNICAL FIELD

The present invention relates to a permanent magnet type motor and an electric power steering apparatus equipped with the same, the permanent magnet type motor being composed of a stator in which multiple polyphase windings are wound around a stator core and a rotor in which magnetic substance protrusion portions are each provided between different pole permanent magnets arranged next to a rotor core.

BACKGROUND ART

Patent Document 1 discloses a multiple polyphase winding motor which has a plurality of groups of polyphase winding groups in one alternating current (AC) motor, the polyphase winding groups each being composed of a polyphase winding and an inverter that drives the polyphase winding. In such a motor, each other's inverters are energized so that a torque ripple generated by one polyphase winding and a torque ripple generated in the other polyphase winding become reversed phases; and thus, the whole motor torque ripple can be cancelled out.

RELATED ART DOCUMENT

Patent Document

Patent Document 1: JP-A-H7-(1995)-298685

SUMMARY OF THE INVENTION

Problems to be Solved by the Invention

However, in the multiple polyphase winding AC motor, if a plurality of polyphase windings are adjacently arranged, a magnetic flux made by one polyphase winding is interlinked with the other polyphase winding; and thus, the other polyphase winding is made to generate voltage. This superimposes disturbance onto an applied voltage for energizing by the inverter of the other polyphase winding; and accordingly, a problem exists in that it becomes more difficult to perform motor control in which the torque ripples generated by each other's polyphase windings are cancelled out in reversed phases.

In view of the foregoing problem, the present invention provides a permanent magnet type motor and an electric power steering apparatus equipped with the same, the permanent magnet type motor being capable of ensuring motor controllability.

Means for Solving the Problems

According to the present invention, there is provided a permanent magnet type motor including: a stator having a stator core in which an armature winding is incorporated in slots; and a rotor which has a rotor core facing the stator via an air gap on the inner circumferential side of the stator and is rotatably and removably supported by a rotating shaft. In the permanent magnet type motor, the armature winding is a plurality of sets of polyphase windings; the plurality of sets of the armature winding are supplied with current from each individual inverter; the rotor core is provided with permanent magnets on a surface portion thereof, the permanent magnets being circumferentially arranged and the adjacent permanent magnets having polarities opposite to each other. Then, a protrusion portion is provided between the adjacent permanent magnets, the protrusion portion being provided in a protruding condition from the rotor core and being made of a magnetic substance; and a non-magnetic gap portion is interposed between the protrusion portion and the permanent magnet in the whole or at a part in a rotating shaft direction.

Advantageous Effect of the Invention

The permanent magnet type motor according to the present invention is provided with the magnetic substance protrusion portion between the adjacent permanent magnets, with regard to a multiple polyphase current AC motor, whereby reluctance torque can be increased in the individual polyphase winding and high output of the motor can be achieved. On the other hand, the permanent magnets are arranged on the surface portion of the rotor core, thereby increasing a magnetic gap between the rotor and the stator; and the non-magnetic gap portion is provided between the permanent magnet and the protrusion portion, thereby suppressing an increase of magnetic coupling between the polyphase windings, that is, mutual inductance, whereby even when a control response frequency of current is high, it is difficult to superimpose a disturbance voltage between the polyphase windings to each other and it becomes possible to perform motor control that cancels out torque ripples. Then, even in the electric power steering apparatus equipped with the permanent magnet type motor according to the present invention, similar effects can be exhibited.

Objects, features, aspects, and advantageous effects other than the above mention of the present invention will become more apparent from the following detailed description of the present invention which refers to the accompanying drawings.

MODE FOR CARRYING OUT THE INVENTION

Embodiment 1.

Figure 18:
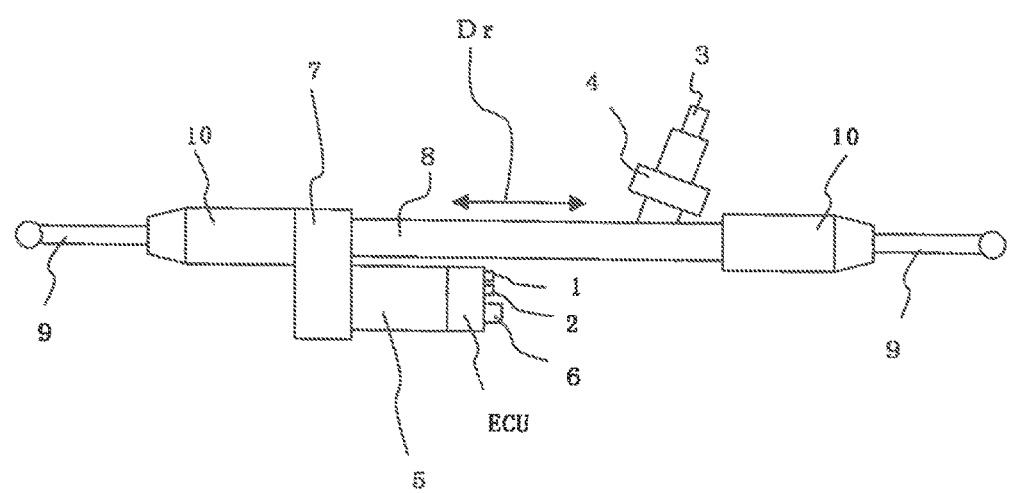
FIG. 18 is an explanation view showing the configuration of a general electric power steering apparatus.

FIG. 18 is an explanation view showing the configuration of a general electric power steering apparatus of an automobile. A driver performs steering of a steering wheel (not shown in the drawing); and its torque is transmitted to a shaft 3 via a steering shaft (not shown in the drawing). At this time, torque detected by a torque sensor 4 is converted to an electrical signal and is transmitted to an electronic control unit (ECU) via a connector 1 through a cable (not shown in the drawing). The ECU is equipped with a control substrate and an inverter circuit that drives a motor. On the other hand, automobile information such as vehicle speed is converted to an electrical signal and is transmitted to the ECU via a connector 2. The ECU calculates necessary assist torque from the torque and the automobile information such as the vehicle speed and supplies current to a permanent magnet type motor 5 through an inverter.

The permanent magnet type motor 5 is disposed in a direction parallel to the movement direction Dr (shown by an arrow) of a rack shaft. Furthermore, power source supply to the ECU is performed from a battery or an alternator via a power source connector 6. Torque generated by the motor 5 is decelerated by a gear box 7 in which a belt (not shown in the drawing) and a ball screw (not shown in the drawing) are incorporated and generates propulsive force that moves the rack shaft (not shown in the drawing) placed inside a housing 8 in the direction of the arrow Dr to assist steering force of the driver. This allows a tie-rod 9 to move and thus tires can be turned to circle the vehicle. The driver is assisted by the torque of the permanent magnet type motor 5 and can circle the vehicle with less steering force. Incidentally, a rack boot 10 is provided so that a foreign substance does not enter into the device. Furthermore, the motor 5 and the ECU are integrated to constitute an electric drive apparatus.

Figure 4:
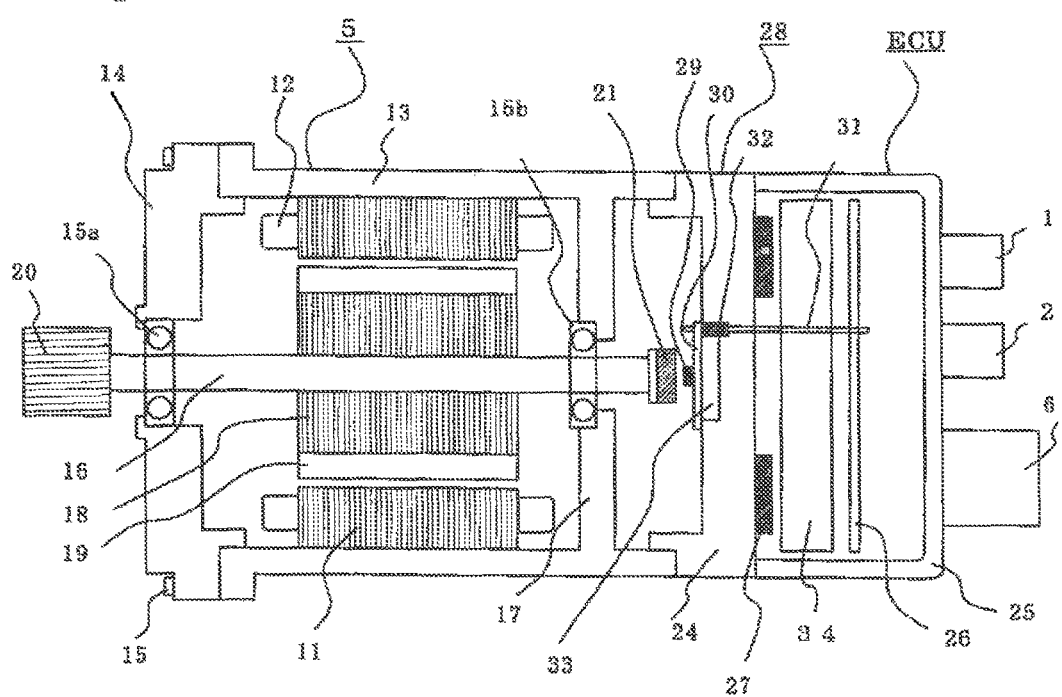
FIG. 4 is an explanation view showing the configuration of an electric drive apparatus in Embodiment 1.

FIG. 4 is an explanation view showing the configuration of the electric drive apparatus in Embodiment 1. Incidentally, the same reference numerals as those shown in the respective drawings represent the same or corresponding elements. The electric drive apparatus is structured such that the multiple polyphase winding AC motor serving as the permanent magnet type motor of the present invention and the ECU are integrated. First, the permanent magnet type motor having multiple polyphase windings will be described. The permanent magnet type motor 5 has a stator core 11 configured by laminating magnetic steel sheets, an armature winding 12 incorporated in the stator core 11, and a frame 13 that fixes the stator core 11. Further, the frame 13 is fixed by a housing 14 provided on a front surface portion of the motor 5 and bolts 15. A bearing 15a is provided on the housing 14; and the bearing 15a rotatably supports a rotating shaft (shaft) 16 together with a bearing 15b. The bearing 15b is supported by a wall portion 17 which is provided integrally with or separately from the frame 13. A rotor core 18 is press-fitted onto the shaft 16; and permanent magnets 19 are fixed to the rotor core 18. A pulley 20 that drives the rack shaft is coupled to a front end portion of the shaft 16. A permanent magnet for a sensor 21 is coupled to a rear end portion of the shaft 16.

The frame 13 is fixed by the housing that doubles as a heat sink 24 provided on a rear surface portion of the motor 5. A case 25 is fixed to a rear surface portion of the heat sink 24 in a sealed manner. A control substrate 26 of the ECU and switching elements 27 that constitute inverter circuits for driving the motor 5 are incorporated with an intermediate member 34 interposed inside the case 25. The switching elements 27 are mounted on the heat sink 24 and dissipate generated heat. A sensor portion 28 that detects a rotational position of the motor 5 is provided with a substrate 30 with a magnetic sensor 29 facing the permanent magnet for the sensor 21 coupled to the shaft 16. The sensor portion 28 outputs the rotational position of the motor 5 to the control substrate 26 via a connection member 31, the rotational position being detected by the magnetic sensor 29. Reference numeral 32 denotes a supporting portion that fixes the connection member 31 to the substrate 30; and 33 denotes a concave portion provided on the heat sink 24, face to face with the substrate 30.

Figure 5:
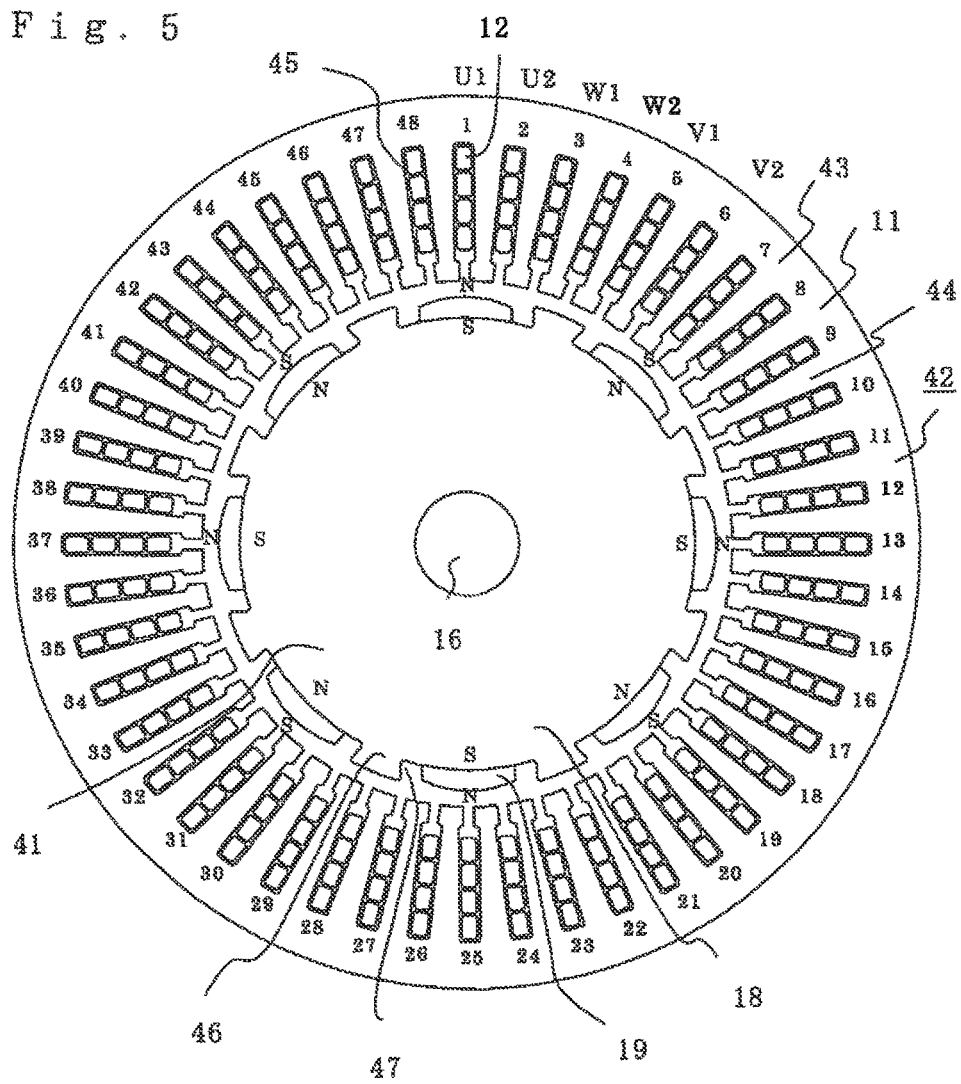
FIG. 5 is a sectional view showing the configuration of a permanent magnet type motor of multiple polyphase windings in Embodiment 1.

FIG. 5 is a sectional view showing the configuration of the permanent magnet type motor of the multiple polyphase windings. A stator 42 is provided on the outer circumferential side of the rotor 41; and the stator 42 has the armature winding 12 and the stator core 11. The stator core 11 is composed of an annular core back 43 made of a magnetic substance such as electromagnetic steel sheets and teeth 44 extending from the core back 43 to the inner circumferential side. The armature winding 12 is incorporated in slots 45 provided between the adjacent teeth 44. Although not shown in the drawing, insulating paper or the like is inserted between the armature winding 12 and the stator core 11 to secure electrical insulation. For example, a total of forty-eight teeth 44 are provided; and therefore, the number of the slots 45 is also forty-eight. Slot numbers 1 to 48 are given to the slots 45. Coils of the armature winding 12 are incorporated in the slots 45.

A first armature winding set is composed of three phases of a U1-phase, a V1-phase, and a W1-phase (refer to FIG. 1); and a second armature winding set is composed of three phases of a U2-phase, a V2-phase, and a W2-phase. As shown in FIG. 5, the windings are arranged in the order of U1, U2, W1, W2, V1, and V2 from a first slot; and the windings are also arranged in the order of U1, U2, W1, W2, V1, and V2 from a subsequent seventh slot and are arranged in the similar order to a forty-eighth slot. More specifically, the first armature winding and the second armature winding are arranged in adjacent slots. In this regard, however, the armature windings are arranged so that U1 of the first slot and U1 of the seventh slot are opposite to each other in current direction, more specifically, it is configured to be a distributed winding which is wound from the first slot to the seventh slot. The armature windings straddle a total of six teeth 44. This corresponds to an electrical angle of 180 degrees and a short pitch winding coefficient becomes 1. Thus, a magnetic flux generated by the permanent magnets can be effectively used, a small size and high torque motor can be obtained, and the amount of the permanent magnets can be reduced; and therefore, an effect exists in that a reduction in cost can be achieved as compared to a motor with a small winding coefficient.

The rotor 41 equipped with the permanent magnets 19 facing the stator core is provided on the surface of the rotor core 18 on the inner circumferential side of the stator 42. The configuration is made such that eight permanent magnets 19 are circumferentially disposed. Polarities of the adjacent permanent magnets 19 are opposite to each other. Further, a protrusion portion 46 is each provided between the permanent magnets 19 on the surface of the rotor core 18. A non-magnetic gap portion 47 is each provided between the protrusion portion 46 and the permanent magnet 19 on both sides of the protrusion portion 46, the magnetic gap portion 47 being for reducing a leakage magnetic flux. An effect exists in that the protrusion portion 46 reduces an air gap of the motor 5 and inductance is increased. This easily exhibits the effect of weak magnetic flux control and an effect exists in that torque during high speed rotation can be improved. The rotor core 18 is configured by laminating electromagnetic steel sheets or the like; and the electromagnetic steel sheets are coupled to each other by a caulking portion (not shown in the drawing). The shaft 16 passes through the center of the rotor core 18. Incidentally, in FIG. 5, a metallic protective tube may be provided so as to cover the outer circumference of the permanent magnets 19 for scattering prevention of the permanent magnets 19. The protective tube is made of, for example, non-magnetic metal such as aluminum and stainless steel (SUS).

Figure 6:
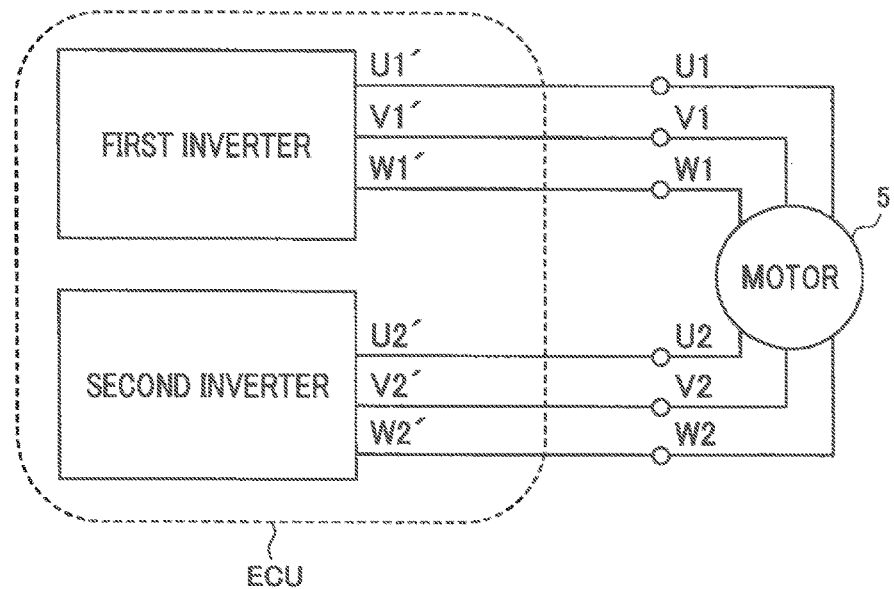
FIG. 6 is a circuit diagram for explaining a method of driving the multiple polyphase winding AC motor in Embodiment 1.

FIG. 6 is a circuit diagram for explaining a method of driving the multiple polyphase winding AC motor in Embodiment 1. As shown in the same drawing, the armature windings of six phases (U1, V1, W1, U2, V2, W2) of the multiple polyphase winding AC motor 5 are connected to three-phase terminals (U1', V1', W1') of a first inverter and three-phase terminals (U2', V2', W2') of a second inverter in such a manner that U1 and U1', U2 and U2', V1 and V1', V2 and V2', W1 and W1', and W2 and W2' are connected.

In the multiple polyphase winding motor 5 driven by such a plurality of inverters, a magnetic flux made by one polyphase winding set is interlinked with the other polyphase winding set; and thus, it makes the other polyphase winding generate voltage. This superimposes disturbance onto an applied voltage which is for energizing the other polyphase winding set by the inverter; and accordingly, a problem exists in that it becomes more difficult to perform motor control in which torque ripples generated by each other's polyphase windings are cancelled out in reversed phases.

Figure 1A:
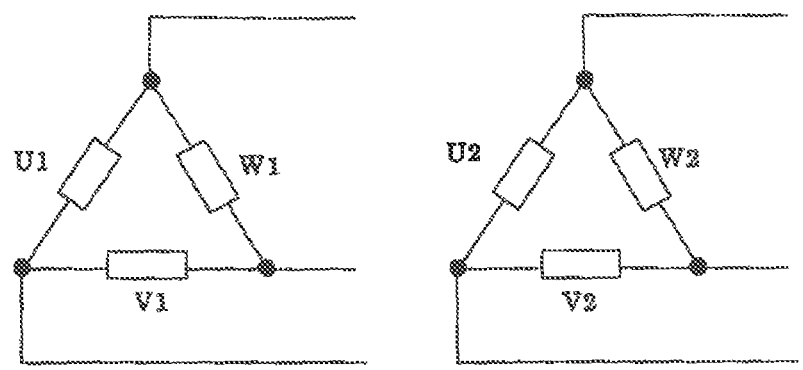
FIG. 1A and FIG. 1B are explanation views each showing a method of connecting an armature winding of a multiple polyphase winding AC motor in Embodiment 1 of the present invention.
Figure 1B:
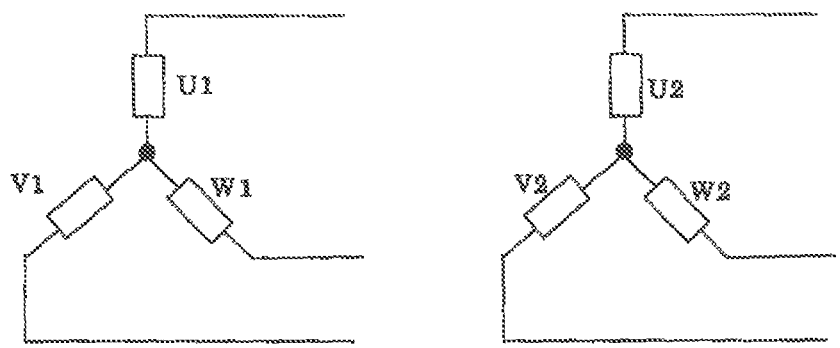
Figure 2:
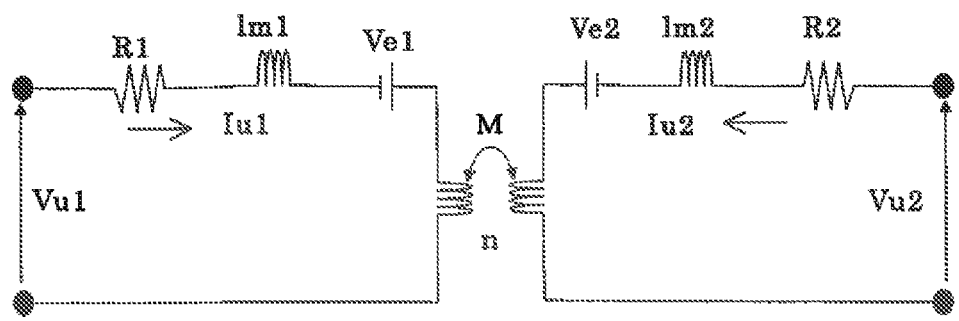
FIG. 2 is an explanation view showing an equivalent circuit of the armature winding between sets of the multiple polyphase winding AC motor in Embodiment 1.

FIG. 1 is an explanation view showing a method of connecting the armature windings of a double three-phase winding motor. FIG. 1A is an explanation view of Δ-connection; and FIG. 1B is an explanation view of Y-connection. The present invention can be applied to either Δ-connection or Y-connection. An equivalent circuit of the armature winding of the U1-phase of the first winding set (first armature winding set) and the U2-phase of the second winding set (second armature winding set) can be represented like FIG. 2. In FIG. 2, Vu denotes each terminal voltage of the windings; Iu denotes current; R denotes resistance; Ve denotes induced voltage; lm denotes leakage inductance; and M denotes mutual inductance; and subscripts 1, 2 denote the primary side and the secondary side, respectively. Furthermore, n is equivalent to the ratio of winding turns in transformers. Incidentally, among these values, particularly, unlike values for use in ordinary motor control, lm and M denote inductance between multiple two-phases arranged in parallel.

Furthermore, generally, the number of winding turns of the windings in parallel are the same in the multiple polyphase winding AC motor; and therefore, n is 1. Equivalent circuits of the V1-phase and the V2-phase, the W1-phase and the W2-phase, the U1-phase and the V2-phase, the U1-phase and the W2-phase, the V1-phase and the U2-phase, the V1-phase and the W2-phase, the W1-phase and the U2-phase, and the W1-phase and the V2-phase are also the same as that of FIG. 2; and therefore, in the case of three-phase balance, even when coordinate transformation is performed from UVW three phases to d-q axes of the rotor, an equivalent circuit at the d-q axes is the same as the equivalent circuit shown in FIG. 2.

Figure 3:
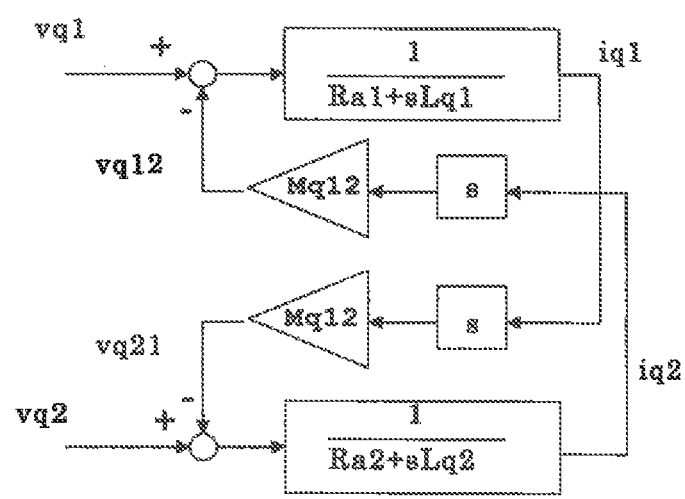
FIG. 3 is an explanation view showing the configuration of an equivalent circuit of a q-axis of the multiple polyphase winding AC motor in Embodiment 1.

Further, FIG. 3 shows that an equivalent circuit at a q-axis when coordinate transformation is performed to the d-q axes of the rotor is represented in a block diagram style. In the drawing, vq1 and vq2 denote a q-axis voltage of the first winding set and the second winding set, respectively; iq1 and iq2 denote a q-axis current of the first winding set and the second winding set, respectively; Lq1 and Lq2 denote a q-axis component of self-inductance of the windings of the first winding set and the second winding set, respectively; Ra1 and Ra2 denote a resistance component of the windings of the first winding set and the second winding set; Mq12 and Mq21 denote a q-axis component of mutual inductance of the windings between the first winding set and the second winding set; s denotes a differential operator of Laplace transform; and vq12 and vq21 denote a disturbance voltage that superimposes onto the first winding set and the second winding set by the mutual inductance between the first winding set and the second winding set, respectively. Incidentally, FIG. 3 shows the equivalent circuit at the q-axis of the rotor; however, an equivalent circuit at the d-axis of the rotor is also a similar configuration. The disturbance voltage is proportional to a derivative value S that is a control response frequency of a current and becomes larger as the current is controlled at high speed by motor control; and accordingly, it becomes difficult to perform motor control that cancels out torque ripples at a high response frequency.

Next, reasons why the torque ripple can be reduced by the permanent magnet type motor of Embodiment 1 will be described. As shown in FIG. 5, a slot pitch of the stator core of the permanent magnet type motor is an electrical angle of "360 degrees/48×4=30 degrees" because of the number of slots 48 and the number of poles 8. Further, the first armature winding and the second armature winding are incorporated in the adjacent slots 45; and therefore, U1 and U2 are shifted by an electrical angle of 30 degrees in phase from each other. V1 and V2 and W1 and W2 are also shifted by an electrical angle of 30 degrees in phase from each other. Therefore, when three-phase AC currents which are shifted by 30 degrees in phase from each other are energized to the first armature winding and the second armature winding, phases of a 6th-order torque ripple in electrical angle generated by the magnetomotive force of the first armature winding and a 6th-order torque ripple in electrical angle of the magnetomotive force of the second armature winding are inverted and the 6th-order torque ripples in electrical angle are cancelled out. The energization of the current different in phase in the first armature winding and the second armature winding can be achieved by providing two inverters of the first inverter and the second inverter like FIG. 3 and by circuits that perform individual control, respectively. Incidentally, if a difference of the current phases of the first armature winding and the second armature winding is approximately 20 to 40 degrees, similar effects can be obtained.

Figure 7:
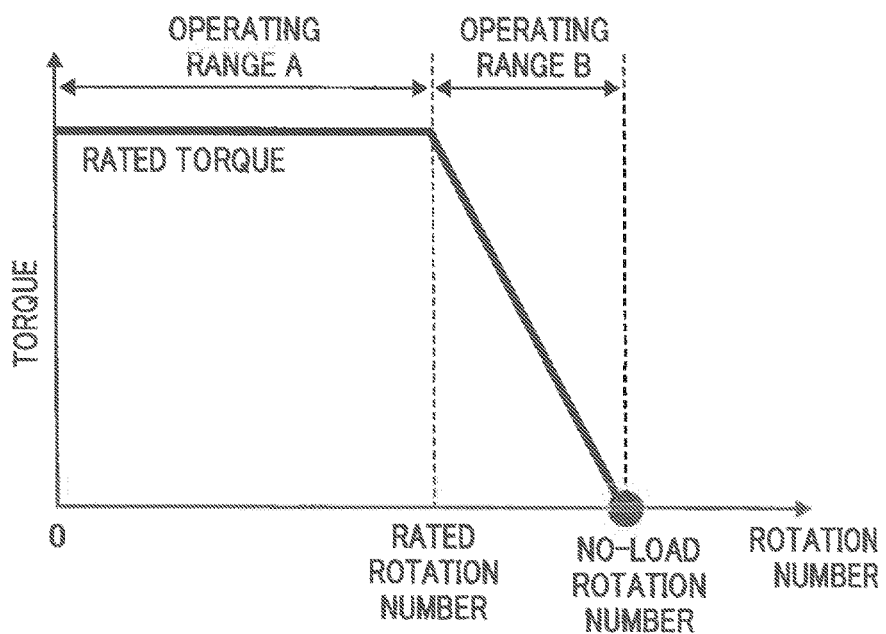
FIG. 7 is an explanation view showing the torque characteristics of the multiple polyphase winding AC motor in Embodiment 1.

FIG. 7 is an explanation view showing torque characteristics of the multiple polyphase winding AC motor in Embodiment 1. In the same drawing, the torque characteristics are represented by torque values when a horizontal axis represents a rotation number. The output of the multiple polyphase winding AC motor is represented by the product of rotation number and torque; and therefore, the torque characteristics in FIG. 7 need to achieve higher torque and higher rotation in order to achieve high output of the multiple polyphase winding AC motor. In this case, as shown in FIG. 7, the torque characteristics can be classified into an operating range A and an operating range B from a difference of driving conditions. In the operating range A, the amount of current to be supplied to the motor is limited and therefore torque has small dependencies on rotation number; and in the operating range B, the amount o77f voltage to be supplied to the motor is limited and therefore torque has large dependencies on rotation number. More specifically, in order to achieve high output of the motor, the torque of the operating range A and the torque of the operating range B different in driving conditions need to improve together.

Figure 8:
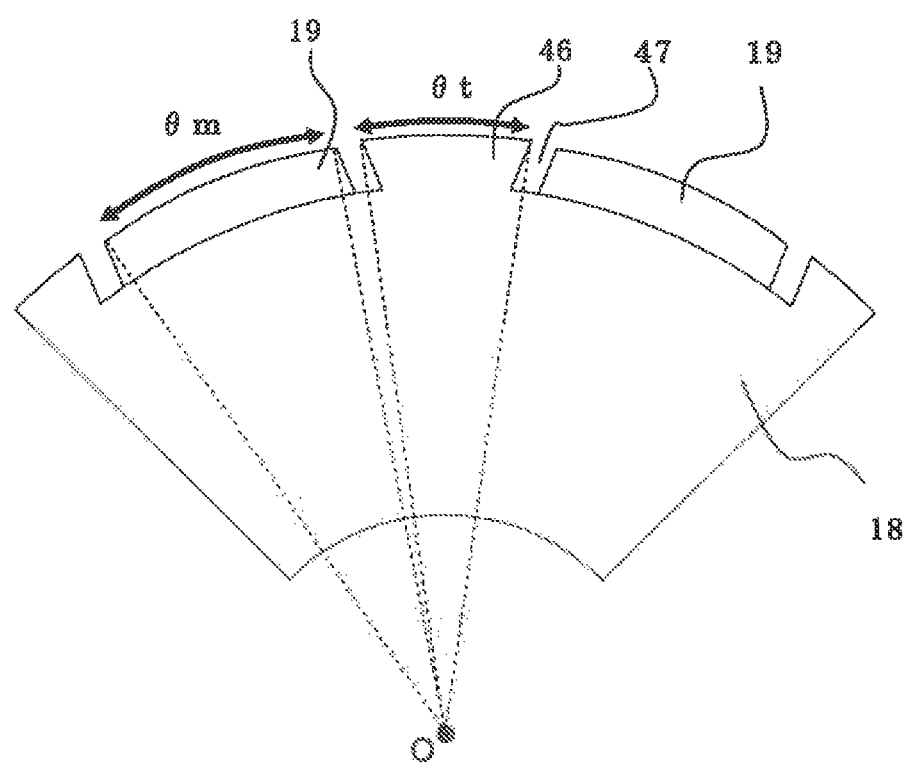
FIG. 8 is an explanation view showing a rotor according to Embodiment 2 in a simplified manner.

In the multiple polyphase winding AC motor in Embodiment 1, a substantially constant d-axis current is supplied regardless of the rotation number in order to maximize the torque in the operating range A; and a d-axis current different for each rotation number is supplied in order to alleviate voltage saturation in the operating range B. In this case, torque T of the multiple polyphase winding AC motor of Embodiment 1 is represented as follows:

[Numerical Expression 1]

$$T = \frac{P}{2}\phi_m i_q + \frac{P}{2}(L_d - L_q)i_d i_q \qquad \text{Equation (1)}$$

where, φm of Equation (1) denotes the amount of magnetic flux generated by the permanent magnets; id and iq denote the d-axis current and the q-axis current, each to be supplied to the multiple polyphase windings; and P denotes the number of magnetic poles of the multiple polyphase winding AC motor. Furthermore, a first item on the right-hand side represents magnet torque and a second item represents reluctance torque. In Embodiment 1, as shown in FIG. 8, there has a protrusion portion 46 with an angle θt taken up by a plane facing the stator core (armature), the protrusion portion 46 being provided in a protruding condition from the rotor core (field pole core) 18 between the adjacent permanent magnets 19 and being made of a magnetic substance; and therefore, more particularly, Lq that represents transmittability of the magnetic flux in a q-axis direction is improved as compared to Ld. Consequently, in Embodiment 1, the d-axis current is supplied in the operating range A and the operating range B and therefore the reluctance torque of Equation (1) can be utilized and the torque of the operating range A and the operating range B (high speed range) can be improved. Therefore, the multiple polyphase winding AC motor can achieve high output. In this case, the inductance Lq of the motor depends on the angle θt at which the protrusion portion 46 shown in FIG. 8 takes up the plane facing the stator core; and the torque of the motor in the operating range A and the operating range B can be determined by adjusting θt. Incidentally, in FIG. 8, θm denotes an angle taken up by a plane of the permanent magnet 19 facing the stator core, the permanent magnet 19 being provided on the surface of the rotor core 18; and O denotes the rotation center of the rotor.

Next, the influence of the disturbance voltage in Embodiment 1 will be considered. In this case, as is apparent from FIG. 3, in the multiple polyphase winding AC motor having multiplexed windings, the disturbance voltage is interacted to each other to act as disturbance values iq1', iq2' with respect to a current control system. The disturbance values iq1', iq2' are represented from the block diagram of the q-axis equivalent circuit of FIG. 3 as follows:

[Numerical Expression 2]

$$i'_{q1} = -\frac{sM_{q12}i_{q2}}{R_{a1} + sL_{q1}} \qquad \text{Equation (2)}$$

$$i'_{q2} = -\frac{sM_{q12}i_{q1}}{R_{a2} + sL_{q2}} \qquad \text{Equation (3)}$$

where, iq1 and iq2 denote the q-axis current of each winding of the first winding set and the second winding set; Ra1 and Ra2 denote a resistance value of each winding of the first winding set and the second winding set; Lq1 and Lq2 denote the q-axis component of self-inductance of each winding of the first winding set and the second winding set; and Mq12 denotes the q-axis component of mutual inductance that represents interference of the windings of the first winding set and the second winding set.

From the above mention, when the frequency of the current control is increased, the differential operator s of Laplace transform increases; and from the aforementioned equations, it is apparent that the disturbance value substantially depends on magnetic coupling Mq12/Lq1 or magnetic coupling Mq12/Lq2. When the magnetic coupling increases, the disturbance value increases; and when the disturbance of the current control system increases, response of the current control system cannot be enhanced and controllability of the motor deteriorates. Incidentally, in the armature of Embodiment 1, the first winding set and the second winding set are formed in a symmetric structure; and therefore, it could be considered that Mq12/Lq1 nearly equals Mq12/Lq2. Consequently, afterward, the magnetic coupling will be described with regard to Mq12/Lq1. In this case, the armature coils U1 and U2 are arranged in the adjacent slots; and when an angle between the adjacent slots is expressed as θ (electrical angle), θ is represented by the following equation.

[Numerical Expression 3]

$$\theta = \frac{360 P}{2N}$$ Equation (4)

where, P denotes the number of magnetic poles of the multiple polyphase winding AC motor; and N denotes the number of slots. In Embodiment 1, P is 8 and N is 48 and therefore θ becomes 30 degrees (electrical angle). In this case, for example, when current is supplied to the armature coil U1 of the first winding set to generate a magnetic flux φU1, a magnetic flux φU2 interlinked with the armature coil U2 of the second winding set is simply represented as follows:

[Numerical Expression 4]

$$\varphi_{u2} \approx \varphi_{u1} \cos\theta = \varphi_{u1} \cos(30°)$$ Equation (5)

This is because that the armature coils U1 and U2 have a phase difference of an electrical angle of θ=30 degrees. Furthermore, relationship of Equation (5) is also established even in the combination of the adjacent armature coils between other first winding set and second winding set. Incidentally, Equation (5) is a relational equation regarding the magnetic flux; however, even in the case of a voltage Vu2 generated in the armature coil U2 when a voltage Vu1 is applied to the armature coil U1, a similar relational equation is established. Even in a voltage generated in U2-V2 of the second winding set when U1-V1 of the first winding set of the motor is excited, it shows that the same relational equation is also established.

Therefore, if d-q axis transformation is performed with regard to a magnetic flux generated in a multiple polyphase winding set of the armature when current is supplied to the first winding set, the following equation is established with regard to a q-axis magnetic flux φq1 of the first winding set and a q-axis magnetic flux φq2 of a second winding set.

[Numerical Expression 5]

$$\varphi_{q2} \approx \varphi_{q1} \cos\theta = \varphi_{q1} \cos(30°)$$ Equation (6)

where, the ratio of the amount of magnetic fluxes φq1 and φq2 is Mq12/Lq1, and $$\frac{M_{q12}}{L_{q1}} \approx \cos\theta = \cos(30°) = 0.866$$ Equation (7)

is established.

In the case of 0.866 like Equation (7), a problem exists in that magnetic coupling between the first winding set and the second winding set is large, the response of the current control system cannot be sufficiently enhanced, and controllability of the motor is not good. On the other hand, in Embodiment 1, the magnetic coupling is reduced by devising the structure on the rotor 41 side. In the rotor 41, the permanent magnets 19 are arranged on the surface of the rotor core 18 as shown in FIG. 5. Eight permanent magnets 19 are circumferentially arranged; and with regard to respective magnetizing directions, magnetization is applied such that the magnetizing directions of the circumferentially adjacent permanent magnets 19 are opposite to each other. The permanent magnets 19 are arranged on the surface of the rotor core 18; and thus, a magnetic gap between the rotor 41 and the stator 42 can be increased. Therefore, there can be obtained an effect that the magnetic coupling between the first winding set and the second winding set can be reduced.

Furthermore, the protrusion portion 46 is provided between the adjacent permanent magnets 19. The protrusion portion 46 is made of the magnetic substance. The rotor core 18 is configured by laminating steel sheets such as electromagnetic steel sheets or cold rolled steel sheets (SPCC); and the protrusion portion 46 is configured so as to be integrated by punching the electromagnetic steel sheets or the SPCC by a metal die. The protrusion portion 46 is present; and therefore, an effect exists in that inductance is improved, the effect of weak magnetic flux control is easily exhibited, and torque during high speed rotation can be improved. Furthermore, an effect exists in that the reluctance torque can be generated, torque of the motor can be improved, and the amount of usage of the permanent magnets 19 can be reduced. The non-magnetic gap portion 47 is provided on both sides of the protrusion portion 46 between the permanent magnet 19 and the protrusion portion 46. The gap portion 47 may be an air gap (air) or may be configured by non-magnetic metal such as aluminum and stainless steel (SUS) or resin. In the case where the gap portion 47 is the air gap, weight can be reduced.

The non-magnetic gap portion 47 is present; and thus, a leakage magnetic flux generated between the permanent magnet 19 and the protrusion portion 46 can be reduced. Therefore, an effect exists in that the torque is improved and the amount of usage of the permanent magnets 19 can be reduced. Furthermore, at the same time, the non-magnetic gap portion 47 acts as the magnetic gap between the stator 42 and the rotor 41; and therefore, the magnetic coupling between the windings of the first winding set and the second winding set can be reduced.

Figure 15:
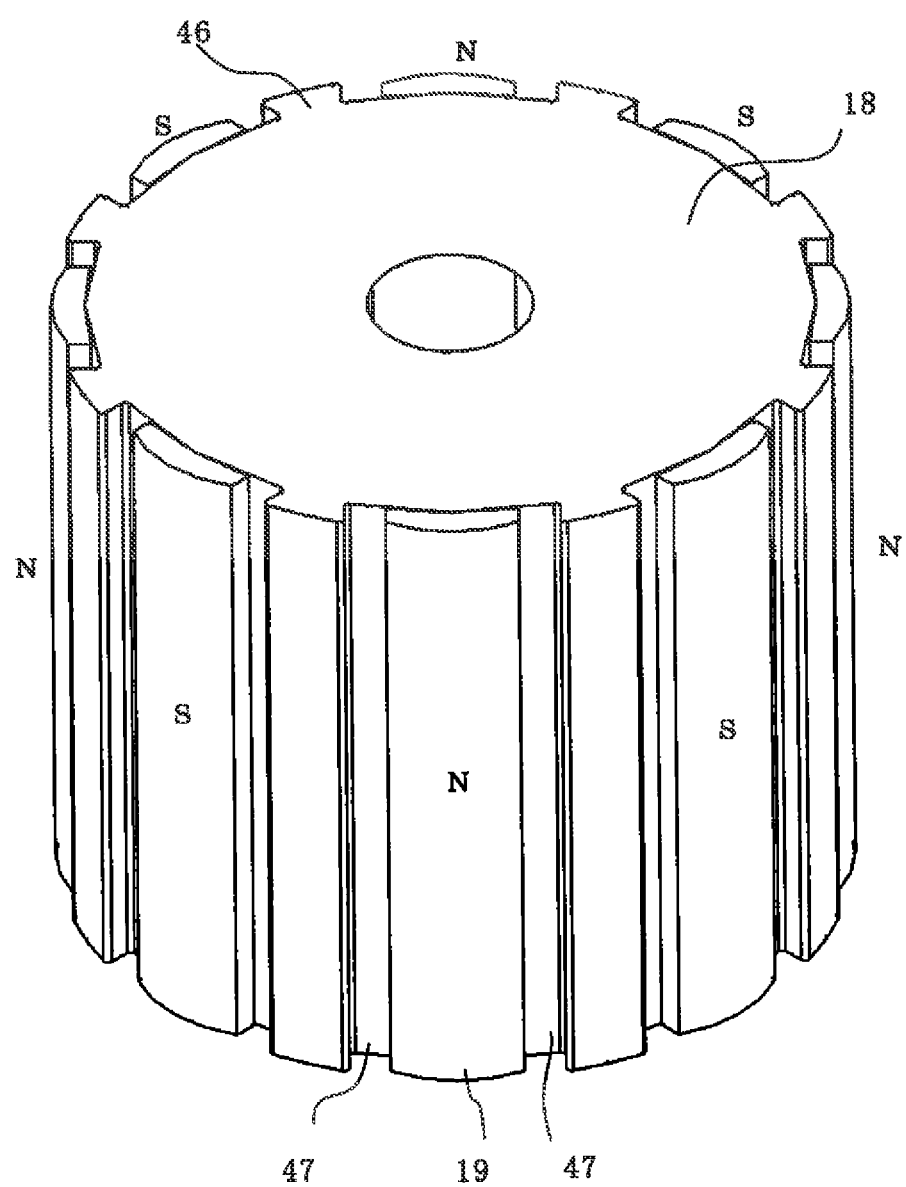
FIG. 15 is a perspective view showing a rotor in Embodiment 1.

FIG. 15 is a perspective view showing a rotor in Embodiment 1. In FIG. 15, the non-magnetic gap portion 47 provided between the permanent magnet 19 and the protrusion portion 46 is provided over the entire axial area. By configuring in such a manner, there can be obtained an effect that the leakage magnetic flux generated between the permanent magnet 19 and the protrusion portion 46 can be effectively reduced and the aforementioned magnetic coupling can be effectively reduced. In this regard, however, the non-magnetic gap portion 47 should not necessarily be provided over the entire axial area. If the width of the protrusion portion 46 is made large in an axially partial area to provide a configuration in which the protrusion portion 46 comes in contact with the side surfaces of the permanent magnet 19, it becomes possible to perform circumferential positioning of the permanent magnets 19; and therefore, there can be improved positional accuracy in which the permanent magnets 19 are arranged. As a result, an effect exists in that a torque ripple caused by unbalance on the rotor side can be reduced.

Figure 17:
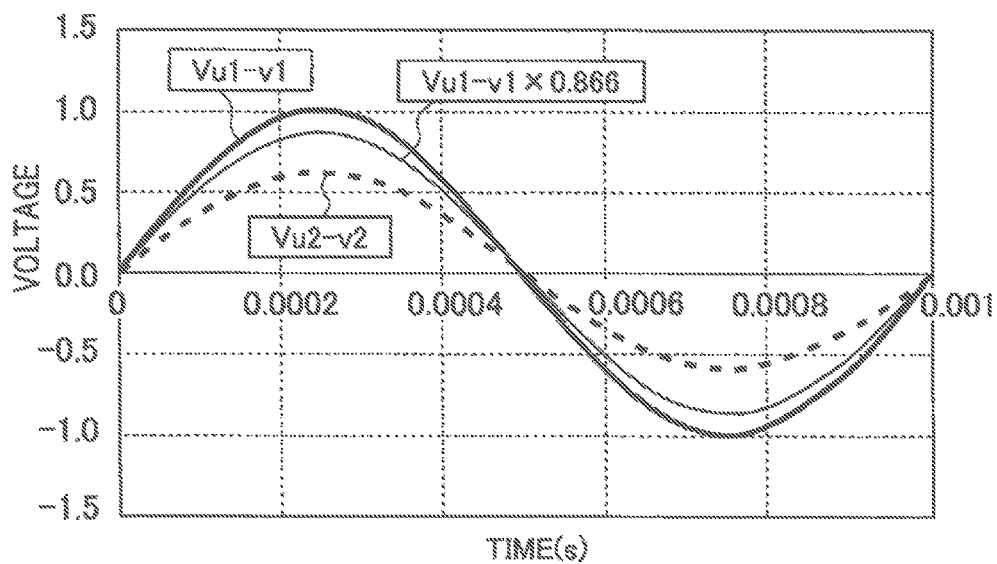
FIG. 17 is an explanation view showing voltage waveforms of motor terminals in Embodiment 1.

By such a configuration,

[Numerical Expression 6]

$$\frac{M_{q12}}{L_{q1}} < 0.866$$ Equation (8)

can be established and there is also obtained an effect that controllability can be improved. This shows that when U1-V1 terminals of the first winding set of the motor are excited by a voltage Vu1-v1, with regard to a voltage Vu2-v2 generated at U2-V2 terminals of the second winding set,

[Numerical Expression 7]

$$\frac{V_{U2-V2}}{V_{U1-V1}} < 0.866 \quad \text{Equation (9)}$$

is established. FIG. 17 shows voltage waveforms when an AC voltage is applied to motor terminals of the first winding set and a voltage at motor terminals of the second winding set is measured. Voltages of a vertical axis are standardized so that Vu1-v1 is set to be 1. Furthermore, a frequency of the voltage represents a high frequency in which resistance is negligible with respect to reactance of the armature winding and is set to be 1 kHz. Furthermore, the voltage waveforms are sine waves. From FIG. 17, Vu2-v2 is sufficiently smaller than a value in which Vu1-v1 is multiplied by 0.866; and therefore, it shows that there can be obtained a motor which satisfies a condition of Equation (9), is small in magnetic coupling between the first winding set and the second winding set, and has good controllability.

Further, the non-magnetic gap portion 47 is provided; and thus, as described above, there can also be obtained an effect that the leakage flux between the permanent magnet 19 and the protrusion portion 46 is reduced and the torque during high speed rotation is improved. Incidentally, in the aforementioned description, the description has been made on the multiple polyphase winding AC motor with 8 poles and 48 slots, in which the winding set has a phase difference of 30 degrees in electrical angle. However, the present invention is not limited to the phase difference between the winding sets, the number of poles, and the number of slots; but a multiple polyphase winding AC motor, in which windings are electrically divided into two winding sets and each winding set is driven by a different motor driving device, can obtain the aforementioned similar effects.

Furthermore, in the aforementioned description, the description has been made on the case where the armature winding is wound around straddling the plurality of teeth 44; however, the same logic as the above-mention is also established even in the case where the armature winding is concentratedly wound around one tooth 44. Furthermore, in the aforementioned description, the description has been made on the case where a winding pitch of the armature winding is an electrical angle of 180 degrees in full pitch winding; however, even in the case where the winding pitch is other than the electrical angle of 180 degrees, the aforementioned similar effect can be obtained. Furthermore, in the aforementioned description, the description has been made on the multiple polyphase winding AC motor in which the windings are electrically separated into two winding sets and are driven by two different motor driving devices. However, even when the number of winding sets to be separated and the number of motor driving devices are increased, the aforementioned similar effect can be obtained.

If the multiple polyphase winding AC motor of Embodiment 1 is applied to an electric power steering apparatus, a torque ripple is reduced and steering feeling of a driver can be improved. Furthermore, the silent properties of a vehicle equipped with the electric power steering apparatus can be improved. The output of the multiple polyphase winding AC motor is improved; and therefore, the electric power steering apparatus can be reduced in size and in weight and there can be obtained an effect that the vehicle equipped with the electric power steering apparatus can be reduced in size and in weight.

Embodiment 2.

Figure 9:
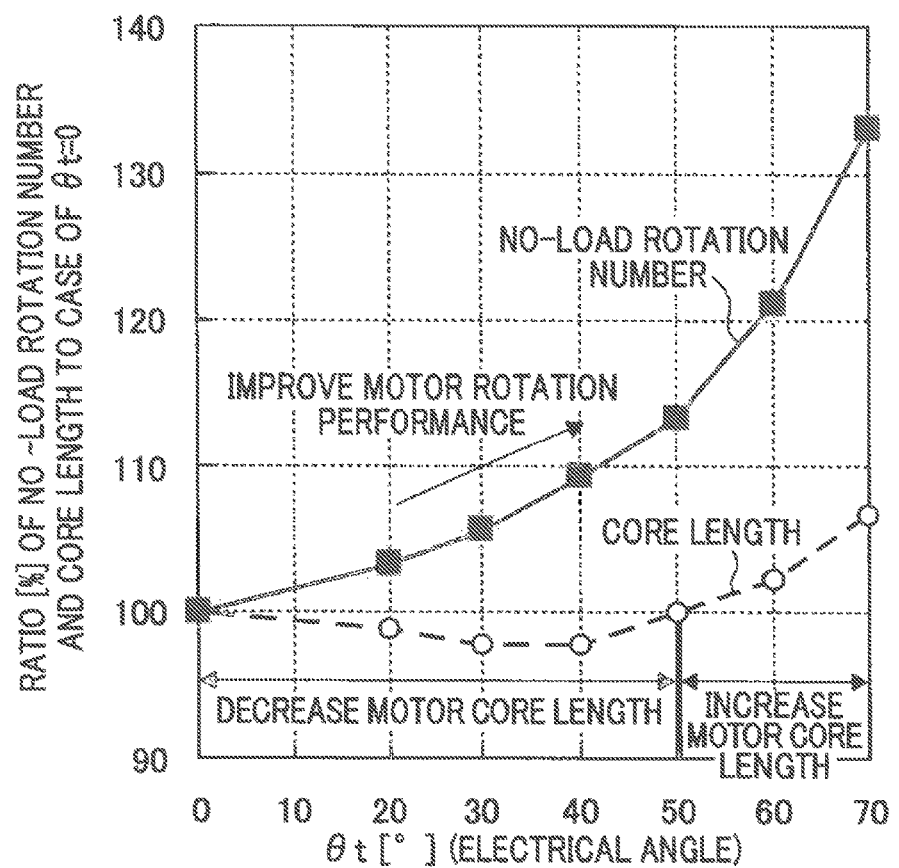
FIG. 9 is a view showing no-load rotation number and core length when an electrical angle θt taken up by a plane of a protrusion portion facing a stator core is changed, with regard to FIG. 8.

FIG. 8 shows the structure of a rotor and shows only for two poles for simplification. In a protrusion portion 46, an angle taken up by a plane facing a stator core is expressed as θt. FIG. 9 is a view showing no-load rotation number and core length (core length in a rotating shaft direction) when θt is changed in FIG. 8. Values are a ratio to a value when the protrusion portion 46 is not provided, more specifically, a value when θt is 0. θt is represented by an electrical angle. Permanent magnets 19 are imposed by a condition in which a cross-sectional area at a motor cross-section (cross-section perpendicular to a rotating shaft) is constant; and the core length is adjusted so that rated torque equals the case when θt is 0. If the width θt of the protrusion portion 46 is increased from 0, the width of the protrusion portion 46 increases. Thus, reluctance torque can be utilized in place of magnet torque; and therefore, the core length decreases, winding resistance also decreases, and the no-load rotation number increases. If in the case of 0<θt≤50 (degrees), the motor core length can be decreased and, at the same time, the no-load rotation number increases. The reluctance torque can be utilized in an operating range B (high speed range) and the magnet torque can be utilized in an operating range A (low rotation range); and torque of the operating range B can be improved without increasing rotating shaft length as compared to the case where the protrusion portion is not provided.

Furthermore, as described above, the permanent magnets 19 are arranged on the surface of a rotor core; and thus, a magnetic gap between a rotor 41 and a stator 42 can be increased. Therefore, there can be obtained an effect that magnetic coupling between a first winding set and a second winding set can be reduced. Furthermore, a non-magnetic gap portion 47 is provided between the permanent magnet 19 and the protrusion portion 46; and therefore, a leakage magnetic flux generated between the permanent magnet 19 and the protrusion portion 46 can be reduced. At the same time, the non-magnetic gap portion 47 acts as a magnetic gap between the stator 42 and the rotor 41; and therefore, an effect exists in that magnetic coupling between armature coils of the first winding set and the second winding set can be reduced.

More particularly, in a motor for electric power steering, a steering wheel has to be turned at high speed in order to avoid an obstacle during emergency avoidance; and accordingly, a high rotation number is needed and high torque is needed during garaging and/or parking. Further, from viewpoints in which an increase in weight which deteriorates fuel consumption has to be avoided, length cannot be elongated in order not to deteriorate mountability, and the like, it shows that 0<θt≤50 (degrees) is an optimum range when the core length is added as constraint, the core length being equivalent to the case where the protrusion portion 46 is not present, more specifically, θt is 0.

Embodiment 3.

Figure 10:
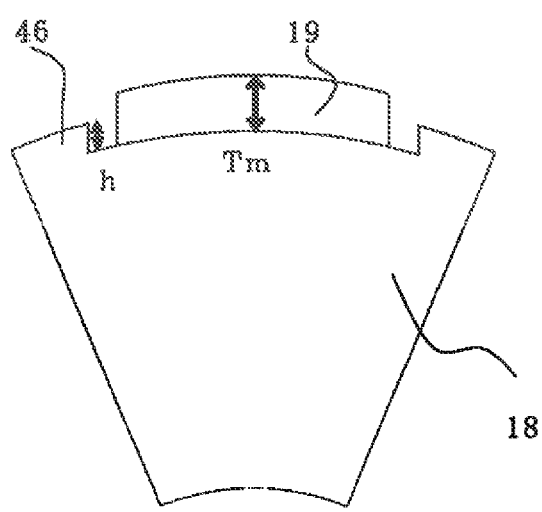
FIG. 10 is an explanation view showing a rotor according to Embodiment 3 in a simplified manner.
Figure 11:
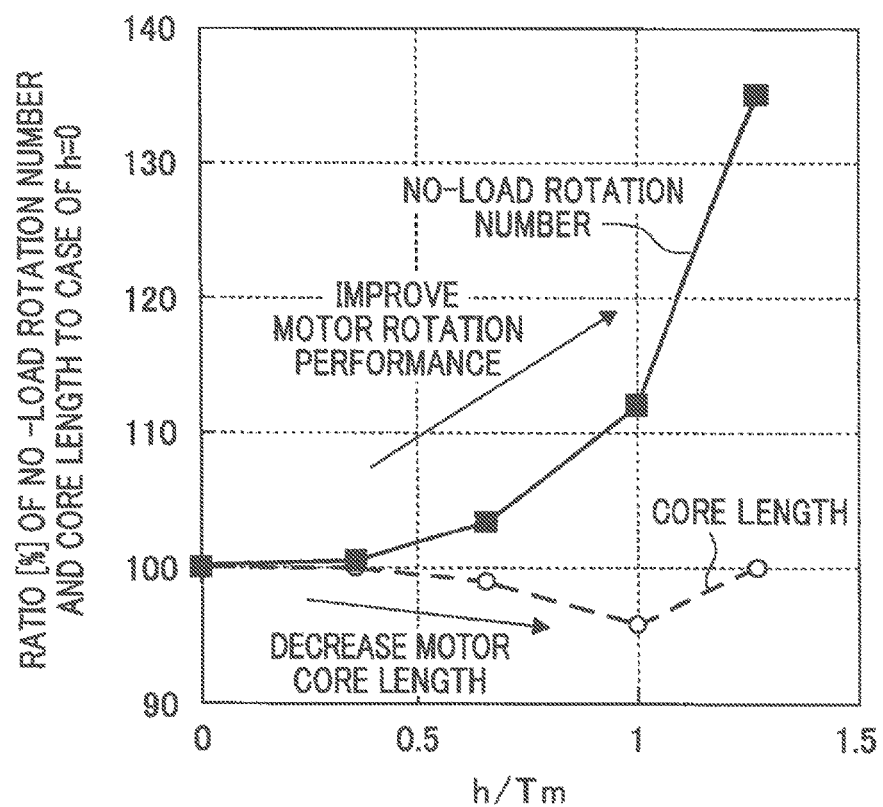
FIG. 11 is a view showing no-load rotation number and core length when the thickness Tm of a permanent magnet is set to be constant and the height h of a protrusion portion is changed, with regard to FIG. 10.

FIG. 10 shows the structure of a rotor and shows only for one pole for simplification. The thickness of a permanent magnet 19 is expressed as Tm; and the height of a protrusion portion 46 (the height of the protrusion portion 46 from the lower end surface of the permanent magnet) is expressed as h. FIG. 11 is a view showing no-load rotation number and core length when the thickness Tm of the permanent magnet 19 is set to be constant and the height h of the protrusion portion 46 is changed. Values are a ratio to a value when the protrusion portion 46 is not present, more specifically, a value when h is 0. The permanent magnets 19 are imposed by a condition in which a cross-sectional area at a motor cross-section is constant; and the core length is adjusted so that rated torque equals the case when h is 0.

As h/Tm increases, the height of the protrusion portion 46 increases; and therefore, reluctance torque can be utilized in place of magnet torque, the core length decreases, winding resistance also decreases, and the no-load rotation number increases. When h/Tm is 1, that is, the height of the protrusion portion 46 equals the thickness of the permanent magnet 19, the core length is minimized. Generally, in a motor with large salient-pole properties like a reluctance motor, a torque ripple increases; and therefore, a range of h/Tm>1 is not preferable since steering feeling deteriorates and a range of 0<h/Tm≤1 is an optimum range that satisfies motor controllability and high rotation performance. Even in this range, core length can be shortened as compared to the case where the protrusion portion 46 is not present; and thus, the motor can be reduced in size and therefore it is predominant from the aspect of improvement in fuel consumption and/or mountability.

Furthermore, as described above, the permanent magnets 19 are arranged on the surface of a rotor core 18; and thus, a magnetic gap between a rotor 41 and a stator 42 can be increased. Therefore, there can be obtained an effect that magnetic coupling between a first winding set and a second winding set can be reduced. Furthermore, a non-magnetic gap portion 47 is provided between the permanent magnet 19 and the protrusion portion 46; and therefore, a leakage magnetic flux generated between the permanent magnet 19 and the protrusion portion 46 can be reduced. At the same time, the non-magnetic gap portion 47 acts as the magnetic gap between the stator 42 and the rotor 41; and therefore, an effect exists in that magnetic coupling between armature coils of the first winding set and the second winding set can be reduced.

Embodiment 4.

Figure 12:
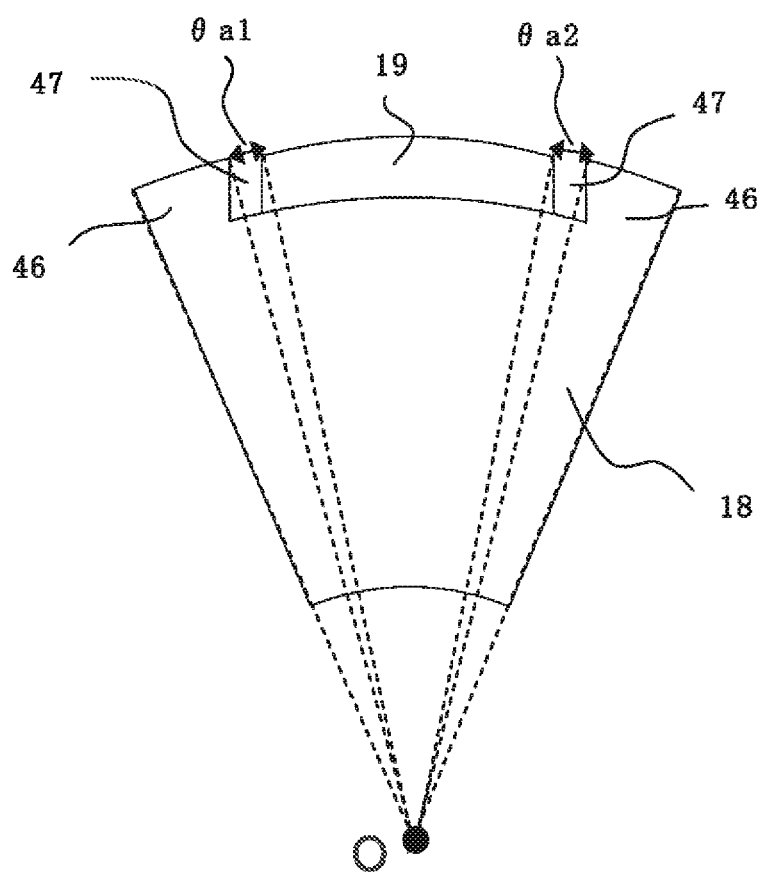
FIG. 12 is an explanation view showing a rotor according to Embodiment 4 in a simplified manner.
Figure 13:
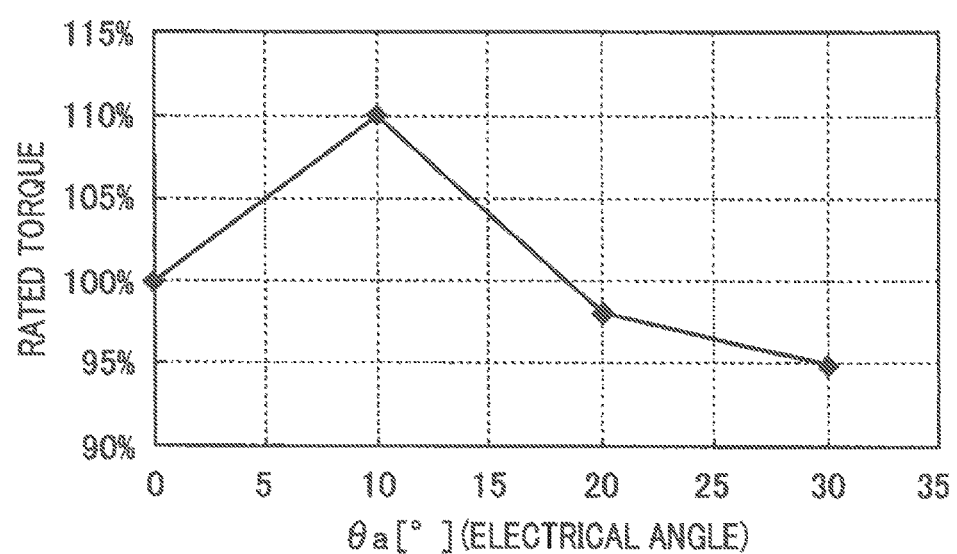
FIG. 13 is a view showing changes of rated torque when an interval between a permanent magnet and a protrusion portion is changed while keeping the width of the protrusion portion constant, with regard to FIG. 12.

FIG. 12 shows the structure of a rotor and shows only for one pole for simplification. Circumferential angles at a non-magnetic gap portion between a permanent magnet 19 and a protrusion portion 46 are expressed as θa1 and θa2. In this case, setting is made as θa1=θa2. By setting as θa1=θa2, magnetic balance can be achieved and thus an effect exists in that a torque ripple can be reduced. FIG. 13 is a view showing changes of rated torque when an interval between the permanent magnet 19 and the protrusion portion 46, more specifically, the circumferential angle of the non-magnetic gap portion 47 is changed while keeping the width of the protrusion portion 46 constant. Values are a ratio in the case when the rated torque is 100%, when the interval is zero. θa of a horizontal axis is defined as θa=θa1+θa2.

As the interval θa increases from 0, the amount of leakage of a magnetic flux of the permanent magnets 19 in a rotor 41 decreases; and accordingly, the amount of magnetic flux that contributes torque increases and the rated torque increases. If the interval θa exceeds 10 degrees, the magnetic flux of the permanent magnets 19a, which contributes the torque, decreases; and accordingly, influence in which the magnetic flux itself of the permanent magnets 19 decreases becomes large. If the interval θa exceeds 20 degrees, the rated torque is reduced than in the case where the interval is 0.

From the above mention, a range of 0<θa<20 (degrees) is an optimum range that increases the rated torque. Furthermore, as described above, the permanent magnets 19 are arranged on the surface of a rotor core 18; and thus, a magnetic gap between the rotor 41 and a stator 42 can be increased. Therefore, there can be obtained an effect that magnetic coupling between a first winding set and a second winding set can be reduced. Furthermore, the non-magnetic gap portion 47 is provided between the permanent magnet 19 and the protrusion portion 46; and therefore, a leakage magnetic flux generated between the permanent magnet 19 and the protrusion portion 46 can be reduced. At the same time, the non-magnetic gap portion 47 acts as the magnetic gap between the stator 42 and the rotor 41; and therefore, an effect exists in that magnetic coupling between armature coils of the first winding set and the second winding set can be reduced.

Embodiment 5.

Figure 14:
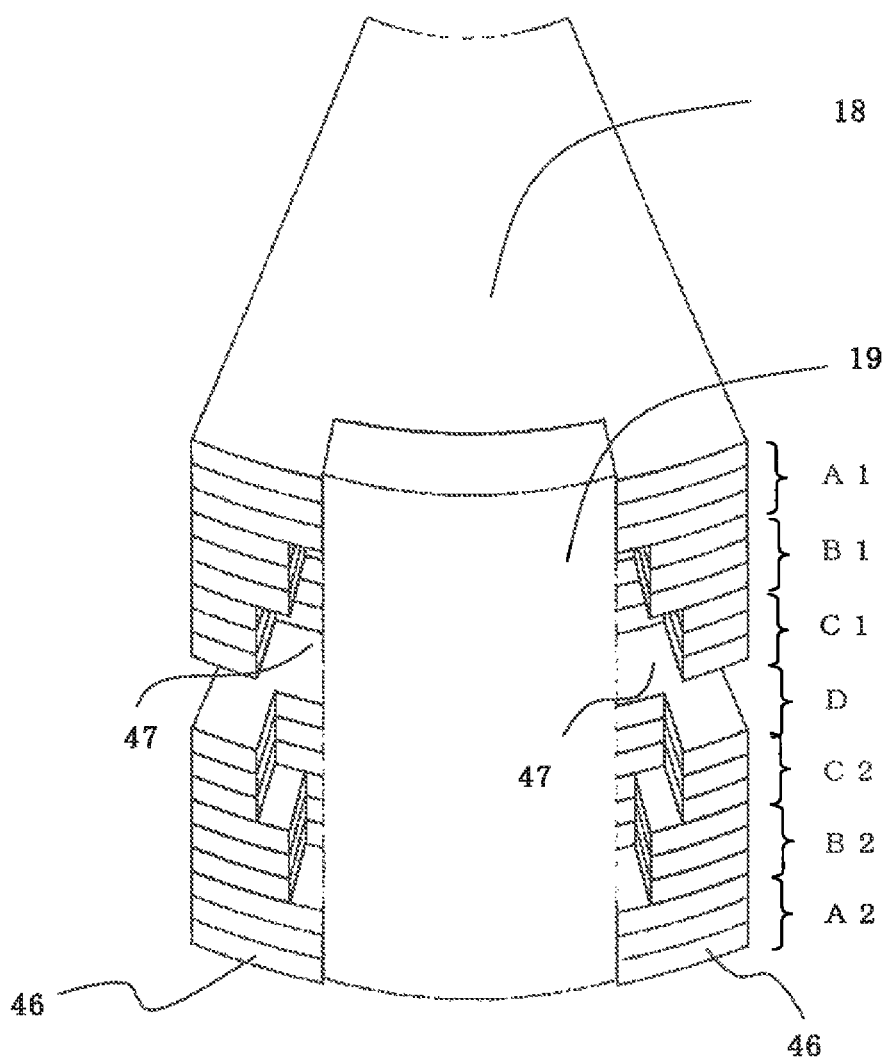
FIG. 14 is an explanation view showing the configuration of a rotor in Embodiment 5.

The description has been made so far on the examples in which the non-magnetic gap portions 47 are uniformly provided in the rotating shaft direction of the motor in Embodiment 1 to 4, but the present invention is not limited to this. FIG. 14 is an explanation view showing a configuration that is laminated by combining a core having a protrusion portion 46, a core without having a protrusion portion 46 or a core with a small protrusion portion 46, or a core having a protrusion portion 46 serving as a retainer of a permanent magnet, in Embodiment 5. Only for one pole is shown for simplification.

In FIG. 14, portions shown by A1, A2 denote areas where the protrusion portions 46 come in contact with a permanent magnet 19 and a non-magnetic gap portion 47 is not present. Portions shown by B1, B2 denote areas where non-magnetic gap portions 47 are provided. Portions shown by C1, C2 denote areas where non-magnetic gap portions 47 wider than that of B1, B2 are provided. D denotes an area where the protrusion portion 46 is not present. The protrusion portions 46 in the areas shown by A1, A2 can be used for positioning the permanent magnet 19. Furthermore, if shapes are different in the width, the height, and the like of the protrusion portion 46, a torque ripple and cogging torque can be changed; and therefore, there can be obtained an effect that the torque ripple and cogging torque can be reduced by combining these portions in the rotating shaft direction as shown in FIG. 14. Furthermore, a rotor core 18 like FIG. 14 can be laminated by devising the configuration of a metal die and the above-mentioned effect can be obtained without considerably increasing costs.

Embodiment 6.

Figure 16:
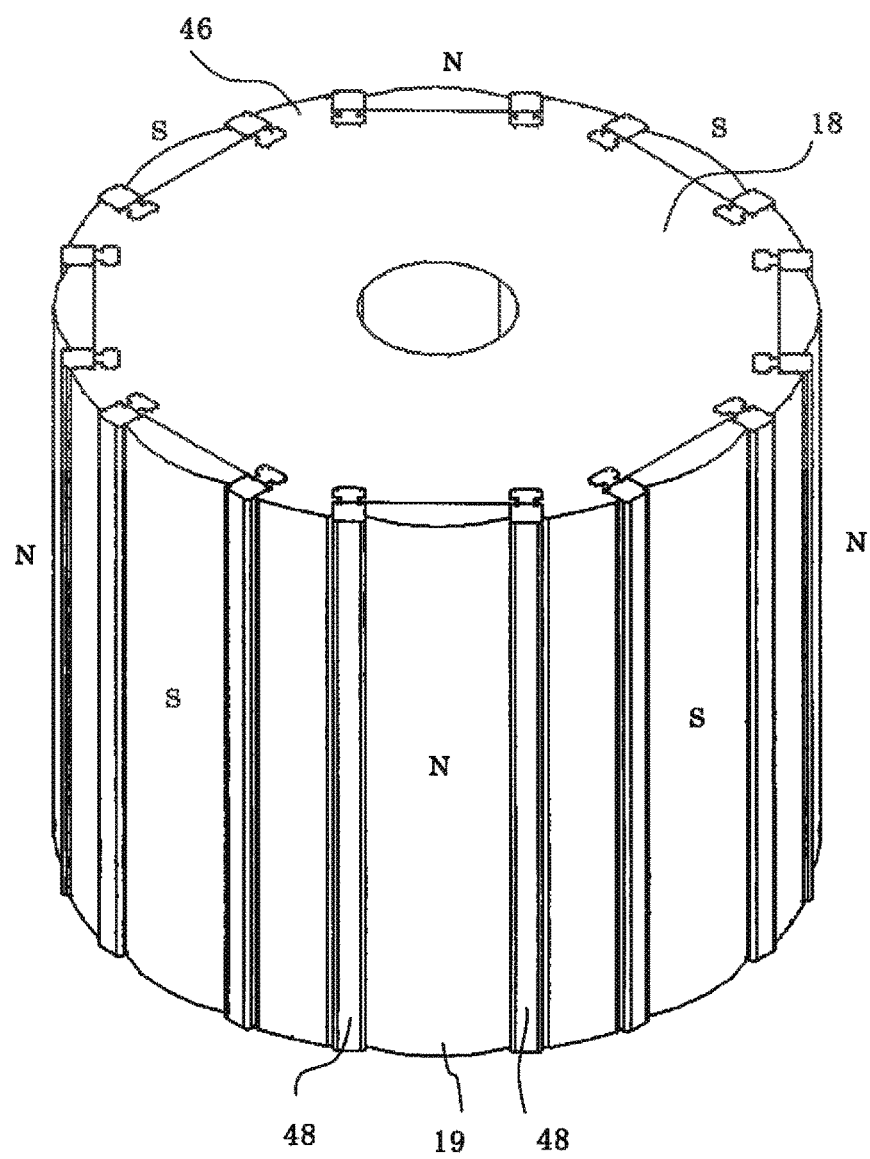
FIG. 16 is a perspective view showing a rotor in Embodiment 6.

The description has been made so far on the examples in which the non-magnetic gap portion between the permanent magnet 19 and the protrusion portion 46 of the rotor core 18 is air in Embodiment 1 to 5, but the present invention is not limited to this. FIG. 16 is a perspective view showing a rotor in which a non-magnetic gap portion is configured by a resin member 48. The non-magnetic gap portion is arranged so that the resin member comes in contact with the side surfaces of permanent magnets 19. This permits circumferential positioning of the permanent magnets 19 and variations in manufacture on the rotor side can be decreased; and therefore, an effect exists in that a motor with a small cogging torque and torque ripple can be obtained. Furthermore, the radial direction of the permanent magnet 19 is fixed by the resin member 48; and thus, the effect of scattering prevention of the permanent magnet 19 can be obtained. Furthermore, if adhesive is omitted, there can be obtained an effect that production costs and material costs can be reduced. In the non-magnetic gap portion 47, the same effect can be obtained by not only resin but also non-magnetic metal such as aluminum and SUS. In this regard; however, the resin is more lightweight as compared to the metal; and therefore, there is the effect of a reduction in weight of the motor and a reduction in inertia.

Incidentally, the present invention can freely combine the respective embodiments and appropriately change and/or omit the respective embodiments, within the scope of the present invention.

The invention claimed is:

1. A permanent magnet type motor, comprising:
    a stator having a stator core in which an armature winding is incorporated in slots; and
    a rotor which has a rotor core facing said stator via an air gap on the inner circumferential side of said stator and is rotatably and removably supported by a rotating shaft,
    wherein said armature winding is a plurality of sets of polyphase windings;
    the plurality of sets of said armature winding are supplied with current from each individual inverter; and
    said rotor core is provided with permanent magnets on a surface portion thereof, said permanent magnets being circumferentially arranged and said adjacent permanent magnets having polarities radially directed opposite to each other, and
    wherein a protrusion portion is provided between said adjacent permanent magnets, the protrusion portion being provided in a protruding condition from said rotor core and being made of a magnetic substance; and
    a non-magnetic gap portion is interposed between the protrusion portion and said permanent magnet in the whole or at a part in a rotating shaft direction,
    wherein said armature winding is two sets of three phase windings;
    a first set of said armature winding is supplied with current from a first inverter;
    a second set of said armature winding is supplied with current from a second inverter;
    when, with regard to two sets of said three phase windings, the first set of said armature winding is represented as a U1-phase, a V1-phase, and a W1-phase and the second set of said armature winding is represented as a U2-phase, a V2-phase, and a W2-phase,
    said windings of the U1-phase and the U2-phase are incorporated in different slots, the different slots being adjacent to each other and shifted by an electrical angle of 30 degrees from each other, and the windings not being disposed in a same slot,
    said windings of the V1-phase and the V2-phase are incorporated in different slots, the different slots being adjacent to each other and shifted by an electrical angle of 30 degrees from each other, and the windings not being disposed in a same slot, and
    said windings of the W1-phase and the W2-phase are incorporated in different slots, the different slots being adjacent to each other and shifted by an electrical angle of 30 degrees from each other, and the windings not being disposed in a same slot, and
    said first inverter and said second inverter are driven by shifting phases of the currents flowing in the first set of said three phase windings and the second set of said three phase windings by an electrical angle of 20 degrees or more and 40 degrees or less to each other.

2. The permanent magnet type motor according to claim 1,
    wherein said first inverter and said second inverter are driven by shifting the phases of the currents flowing in the first set of said three phase windings and the second set of said three phase windings by an electrical angle of 30 degrees to each other.

3. The permanent magnet type motor according to claim 1,
    wherein said rotor core and the protrusion portion provided in the protruding condition from said rotor core are integrally formed by steel sheets and are configured by laminating the steel sheets.

4. The permanent magnet type motor according to claim 1,
    wherein the non-magnetic gap portion interposed between the protrusion portion and said permanent magnet is an air gap.

5. The permanent magnet type motor according to claim 1,
    wherein the non-magnetic gap portion interposed between the protrusion portion and said permanent magnet is configured by a resin member and the resin member is arranged by coming in contact with said adjacent permanent magnets.

6. The permanent magnet type motor according to claim 5,
    wherein the height of the protrusion portion provided in the protruding condition from said rotor core is equal to or less than the height of said permanent magnet.

7. The permanent magnet type motor according to claim 5,
    wherein an electrical angle $\theta a$ taken up by the sum of both non-magnetic gap portions interposed between the protrusion portion provided in the protruding condition from said rotor core and each of said adjacent permanent magnets on both sides thereof is $0<\theta a \leq 20$ degrees, the electrical angle $\theta a$ being faced to said stator core.

8. The permanent magnet type motor according to claim 1,
    wherein an electrical angle $\theta t$ at which the protrusion portion provided in the protruding condition from said rotor core takes up a plane facing said stator core is $0<\theta t \leq 50$ degrees.

9. The permanent magnet type motor according to claim 1,
    wherein the height of the protrusion portion provided in the protruding condition from said rotor core is equal to or less than the height of said permanent magnet.

10. The permanent magnet type motor according to claim 1,
    wherein an electrical angle $\theta a$ taken up by the sum of both non-magnetic gap portions interposed between the protrusion portion provided in the protruding condition from said rotor core and each of said adjacent permanent magnets on both sides thereof is $0<\theta a \leq 20$ degrees, the electrical angle $\theta a$ being faced to said stator core.

11. The permanent magnet type motor according to claim 1,
    wherein the protrusion portions provided in the protruding condition from said rotor core are configured by laminating and combining steel sheets having the protrusion portions different in angle taken up in the circumferential direction of said rotor core.

12. An electric power steering apparatus equipped with the permanent magnet type motor as set forth in claim 1.

* * * * *